US010982948B1

(12) United States Patent
Wang

(10) Patent No.: US 10,982,948 B1
(45) Date of Patent: Apr. 20, 2021

(54) NON-CONTACT MEASURING DEVICE

(71) Applicant: TRIPLE WIN TECHNOLOGY(SHENZHEN) CO.LTD., Shenzhen (CN)

(72) Inventor: Ai-Ning Wang, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/699,959

(22) Filed: Dec. 2, 2019

(30) Foreign Application Priority Data

Oct. 18, 2019 (CN) .......................... 201910990973.7

(51) Int. Cl.
*H04N 5/372* (2011.01)
*G01B 11/02* (2006.01)
*G02B 27/30* (2006.01)

(52) U.S. Cl.
CPC ........... *G01B 11/022* (2013.01); *H04N 5/372* (2013.01); *G02B 27/30* (2013.01)

(58) Field of Classification Search
CPC .............................. G01B 11/022; H04N 5/372
See application file for complete search history.

(56) References Cited

U.S. PATENT DOCUMENTS

| 2002/0140914 | A1* | 10/2002 | Yamada | G03B 27/52 355/40 |
| 2008/0257335 | A1* | 10/2008 | Lowstuter | F24S 23/74 126/605 |
| 2012/0008484 | A1* | 1/2012 | Yamatsu | G11B 7/00455 369/112.23 |
| 2016/0048069 | A1* | 2/2016 | Inoue | H04N 5/2256 348/298 |
| 2017/0052474 | A1* | 2/2017 | Otsubo | G03G 21/1666 |
| 2019/0253695 | A1* | 8/2019 | Festa | H04N 13/243 |

FOREIGN PATENT DOCUMENTS

| CN | 104197834 | 12/2014 |
| TW | I287614 | 10/2007 |
| TW | I484136 | 5/2015 |
| TW | I558978 | 11/2016 |

* cited by examiner

Primary Examiner — Jerry T Jean Baptiste
(74) Attorney, Agent, or Firm — ScienBiziP, P.C.

(57) ABSTRACT

A non-contact measuring device for measuring dimensions of an object using processed light beams from a laser includes a laser source, an attenuator, a lens group, a stage, a charge-coupled device (CCD), and a processor. The stage supports and rotates a measurable object and the light beams passing through or reflected by the object are collected by pixels of the CCD, enabling calculations of the dimensions of the object by the processor.

10 Claims, 2 Drawing Sheets

NON-CONTACT MEASURING DEVICE

FIELD

The subject matter herein generally relates to the technical field of optical measurement, and in particular relates to non-contact dimension measuring devices.

BACKGROUND

Non-contact measurement of external dimensions of an object is a combination of optoelectronic and mechanical technologies, mainly used for industrial detection. However, in order to measure accurately, it may be necessary to manually adjust an object to change its position many times during the measuring process, making the measuring process complicated.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
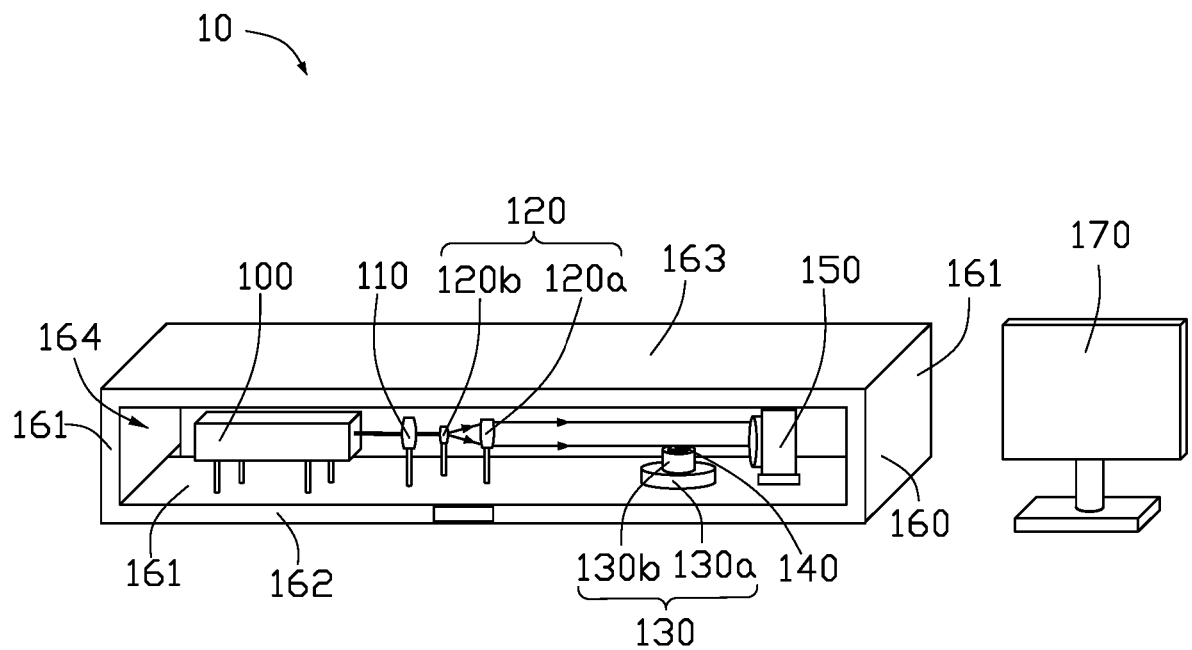
FIG. 1 is a schematic view of a non-contact measuring device according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

FIG. 1 shows a non-contact measuring device 10 according to an embodiment. The non-contact measuring device 10 includes a laser source 100, an attenuator 110, a lens group 120, a stage 130, a charge coupled device (CCD) 150, and a dust-proof box 160. The laser source 100, the attenuator 110, the lens group 120, the stage 130, and the CCD 150 are in the dust-proof box 160, and arranged in a row in sequence.

The laser source 100 is configured to emit laser beams. In one embodiment, the laser source 100 is a He—Ne laser with a wavelength of 632.8 nm and an output power of 1 mW. The He—Ne laser has extremely high beam quality and high parallelism to minimize measurement errors. In other embodiments, lasers that generate beams at other wavelengths may be selected according to actual needs.

The attenuator 110 is on an optical path of the laser beams generated by the laser source 100 and is configured to attenuate a power of the laser beams. The laser beams generated by the laser source 100 propagate onto the attenuator 110 and are attenuated into beams, thereby preventing the laser beams incident on the CCD 150 from damaging the CCD 150 due to high power.

The lens group 120 is on an optical path of the attenuated beams and is configured to expand and collimate the attenuated beams into parallel beams. In one embodiment, the lens group 120 includes a concave lens 120b for diverging the attenuated beams into divergent beams and a convex lens 120a for collimating the divergent beams into the parallel beams.

The stage 130 is configured to carry an object 140 such that the object 140 is on an optical path of the parallel beams. In one embodiment, the object 140 includes an optical lens. The stage 130 is rotatable, so that the object 140 placed on the stage 130 presents different surfaces to be tested, and the object 140 can be measured from various angles.

In one embodiment, the CCD 150 is an area array CCD. The area array CCD can simultaneously receive multiple images, and can be used to measure or detect area, shape, size, position, and temperature of an object. The CCD 150 is configured to receive optical information of the parallel beams after passing through or over the object 140, convert the optical information into digital signals, and transmit the digital signals to a processor 170 (e.g., a computer) to calculate dimensions of the object 140. The parallel beams form a projection (e.g., an optical image) on the CCD 150 after passing through the object 140. A size of the projection is consistent with a size of the object 140. The optical information includes a pixel size of the CCD 150 and a number of pixels which are occupied by the projection. The size of the projection is calculated based on the pixel size of the CCD 150 and the number of pixels occupied by the projection. The CCD 150 converts the optical information into the digital signals and transmits the digital signals to the processor 170 to calculate the dimensions of the object 140.

The dust-proof box 160 protects the CCD 150 from moisture and dust, thereby prolonging the service life of the CCD 150 and making results more accurate. The dust-proof box 160 includes a bottom wall 162, a top wall 163, and a plurality of side walls 161. The top wall 163 is opposite to the bottom wall 162. The plurality of side walls 161 each connects the bottom wall 162 and the top wall 163. The bottom wall 162, the top wall 163, and the plurality of side walls 161 together define a receiving space 164. The laser source 100, the attenuator 110, the concave lens 120b, the convex lens 120a, the stage 130, and the CCD 150 are received in the receiving space 164 and arranged in a row in said sequence. In one embodiment, at least one of the side walls 161 is transparent and coated with a high-reflecting film for isolating stray light. The transparent side wall 161 may be made of transparent tempered glass without affecting an internal visual field. Others of the side walls 161 except the transparent side wall 161 are made of dust-proof and moisture-proof materials, such as aluminum alloy.

Figure 2:
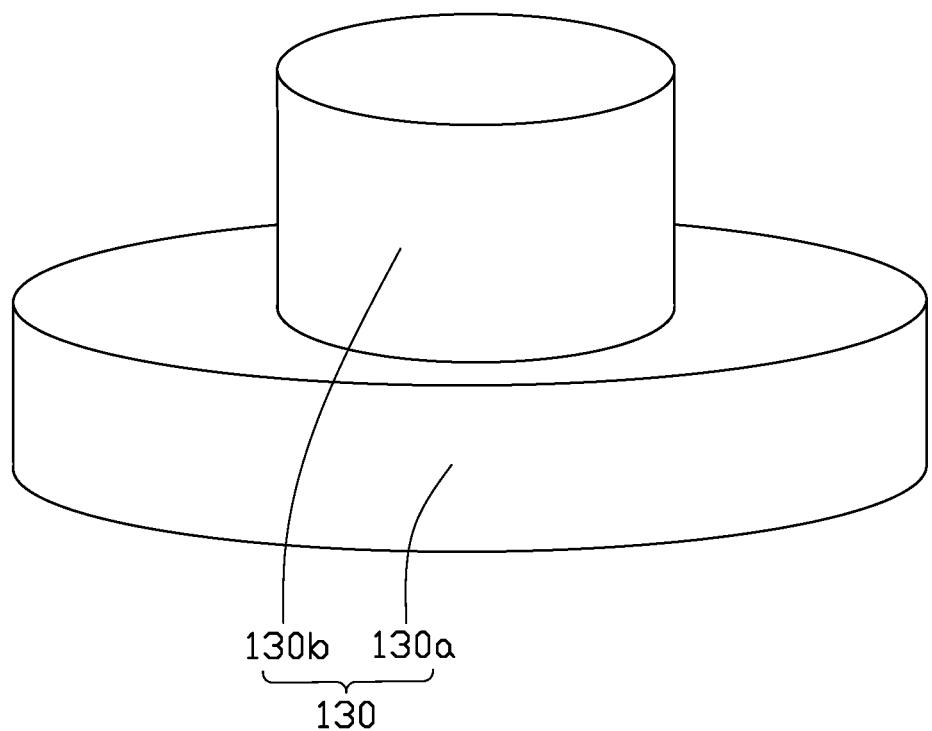
FIG. 2 is an enlarged view of a component (stage) of FIG. 1.

As shown in FIG. 1 and FIG. 2, the stage 130 includes a bottom portion 130a and an upper portion 130b. The bottom portion 130a and the upper portion 130b are both cylindrical. The upper portion 130b can be rotated relative to the bottom portion 130a.

During a measurement process, the object 140 is placed on the upper portion 130b, and the upper portion 130b rotates. The laser source 100 emits laser beams, the laser beams pass through the attenuator 110 and the lens group 120 to become the parallel beams, the optical information of the object 140 is projected onto the CCD 150. The CCD 150 converts the optical information into the digital signals and transmits the digital signals to a computer, thereby an external dimensions of the object 140 are calculated. Due to the upper portion 130b being rotatable relative to the bottom portion 130a, the object 140 can be measured from various angles. Therefore, manual changes of positions of the object 140 are avoided, and the measurement process is automated.

The non-contact measuring device 10 has a compact structure and is low cost. In addition, the non-contact measuring device 10 having the dust-proof box 160 protects the CCD 150 from moisture and dust, thereby prolonging the service life of the CCD 150 and making results more accurate.

In other embodiments, the stage 130 may be an integrally formed rotating body, and the stage 130 is not limited to being in a cylindrical shape.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A non-contact measuring device, comprising:
   a laser source for emitting laser beams;
   an attenuator on an optical path of the laser beams, the attenuator configured to attenuate the laser beams into attenuated beams;
   a lens group on an optical path of the attenuated beams, the lens group being configured to expand and collimate the attenuated beams into parallel beams;
   a stage configured for carrying an object, the object being placed on an optical path of the parallel beams, wherein the stage is rotatable;
   a charge-coupled device (CCD) on a side of the stage, wherein the parallel beams are configured to form a projection on the CCD after passing through the object, a size of the projection is consistent with a size of the object, the CCD is configured to extract optical information from the parallel beams after the parallel beams passing through the object and convert the optical information into digital signals, the optical information includes a pixel size of the CCD and a number of pixels occupied by the projection; and
   a processor electrically connected to the CCD, the processor being configured for receiving the digital signals and calculating a dimension of the object according to the digital signals.

2. The non-contact measuring device according to claim 1, wherein the lens group comprises a concave lens configured for diverging the attenuated beams into divergent beams, and a convex lens configured for collimating the divergent beams into the parallel beams.

3. The non-contact measuring device according to claim 2, further comprising a dust-proof box, wherein the dust-proof box comprises a bottom wall, a top wall opposite to the bottom wall, and a plurality of side walls connecting the bottom wall and the top wall,
   wherein the bottom wall, the top wall, and the plurality of side walls cooperatively define a receiving space, and
   wherein the laser source, the attenuator, the concave lens, the convex lens, the stage, and the CCD are received in the receiving space.

4. The non-contact measuring device according to claim 3, wherein the laser source, the attenuator, the concave lens, the convex lens, the stage, and the CCD are arranged in a row in said sequence.

5. The non-contact measuring device according to claim 4, wherein at least one of the plurality of side walls is transparent and coated with a high-reflecting film configured for isolating stray light.

6. The non-contact measuring device according to claim 5, wherein the side walls other than the at least one of the plurality of side walls which is transparent is made of aluminum alloy.

7. The non-contact measuring device according to claim 1, wherein the laser source is a He—Ne laser.

8. The non-contact measuring device according to claim 1, wherein the CCD is an area array CCD.

9. The non-contact measuring device according to claim 1, wherein the stage comprises a bottom portion and an upper portion, and the upper portion is rotatable relative to the bottom portion.

10. The non-contact measuring device according to claim 9, wherein the bottom portion and the upper portion are both cylindrical.

* * * * *